United States Patent [19]

Van den Heuvel

[11] Patent Number: 4,984,176

[45] Date of Patent: Jan. 8, 1991

[54] VDH BIOCOMPUTER

[76] Inventor: Raymond C. Van den Heuvel, 18618 Celtic St., Northridge, Calif. 91326

[21] Appl. No.: 142,063

[22] Filed: Jan. 11, 1988

[51] Int. Cl.$^5$ .............................................. G06F 15/18
[52] U.S. Cl. ................................................. 364/513
[58] Field of Search ......................................... 364/513

[56] References Cited

U.S. PATENT DOCUMENTS

| | | | |
|---|---|---|---|
| 4,649,506 | 3/1987 | Van den Heuvel | 364/521 |
| 4,803,613 | 2/1989 | Kametani et al. | 364/200 |
| 4,809,222 | 2/1989 | Van den Heuvel | 364/807 |
| 4,868,472 | 9/1989 | Daggett | 364/513 |
| 4,868,763 | 9/1989 | Masui et al. | 364/513 |
| 4,870,590 | 9/1989 | Kawata et al. | 364/513 |

*Primary Examiner*—Allen MacDonald

[57] ABSTRACT

A computer architecture and compansion software are described which are intended to serve the needs of intelligence, simplicity and low cost. A major objective is to reduce the need for large memory capacity and computational "power."

The computational hardware includes a standard central processing unit (or microprocessor) augmented by analog/digital computational hardware and data acquisition circuits that allow random access to and real time processing of data derived from environmental sensors.

The multiprocessing hardware consists of portions of "cache" memory that are "dual-ported."

The representational hardware consists of a vector generator.

The software consists of a new "language" with minimal syntax requirements and representational features that are independent of scale. It shares features with LISP, FORTH and (Hewlett-Packard) RPL but uses a parsing "dispatcher" rather than an "evaluator."

2 Claims, 2 Drawing Sheets

VDH BIOCOMPUTER

CROSS-REFERENCES by the same author

1. U.S. Pat. No. 4,649,506 (Mar. 10, 1987)

2. U.S. Pat. application Ser. No. 06/876,726 June 20, 1986.

BACKGROUND OF THE INVENTION

The VDH BIOCOMPUTER owes its existence to years of effort in bringing low cost and simplicity to the design of data acquistion and representation systems. It began as an adaption of existing data acquistion and display technology to the needs of medical instrumentation in general and biofeedback in particular.

In recent years its achitecture has been modified for a broader range of application. The VDH BIOCOMPUTER can be configured as a simple microprocessor with a minimum of peripheral circuits or it can be expanded into a vast array of multiprocessing units. It can be used as a vehicle for advanced programming and projects in artificial intelligence. The potential fields of application include automotive, health/medical, general instrumentation, security, avionics and spacecraft.

Particular emphasis is given to circuits capable of offloading functions from the software for true real-time performance. A number of digital and analog peripheral circuits have been developed for the purpose. Some of them facilitate pattern recognition. Among the latter is the VDH ORGANIC MEMORY (patent pending).

Since the VDH BICOMPUTER requires its own brand of software, a special syntax has been developed which uses well-behaved, intelligent software building blocks. Built-in hardware and software program development tools, including PROM burners, have been included. Anyone capable of programming a scientific calculator will be able to design "dumb" and/or "intelligent" programs.

Meanwhile the all-important CRT readout had undergone further refinements, leading to a prevented vector generator built with low cost, standard D/A converter arrays. Its performance is free of the closure, brightness and other line quality problems usually encountered in circuits based on integrators. This patented vector generator is also available as a separate, "stand alone" unit, called the VDH VECTOR PERIPHERAL UNIT.

NOVELTY OF THE INVENTION

The present invention addresses and overcomes significant shortcomings of the prior art by providing, in a first aspect, an architecture that makes it possible for a computer to be more capable of acquiring its own data and representing complex results in a more complete, clear and human-understandably way.

In a further aspect, the invention provides hardware methods of offloading functions from the software in order to greatly increase the efficiency of the processor. This is particularly the case for pattern recognition. Said hardware methods also result in more efficient memory use and better, yet more economical, video and audio readouts.

In yet a further aspect, the invention provides software that qualifies as artificial intelligence without exceeding the level of complexity or requiring skills greater than those required when programming a scientific calculator.

In yet a further aspect, the invention provides hardware and software to facilitate "ad hoc" programming, i.e., programming without separate program development systems.

SUMMARY OF THE INVENTION

In order to expand the system into a multiprocessing array and implement asynchronous communication between adjacent CPUs, one or more portions of each CPU's memory can be dual-ported. Each such portion is then accessible by two adjacent CPUs at the same time yet without mutual interference.

In order to support INTELLIGENCE, the chosen CPU is of the type that can accommodate multiple program, memory and stack pointers.

In order to promote the efficient use of large external program and database memories, the chosen CPU is also capable of fast memory-I/O data transfer.

The memory space directly addressed by the CPU address lines is of the RAM type and constitutes a CACHE MEMORY. All other memories are accessed via the I/O ports.

All program code is transportable and "bootstrap" programs are loaded in CACHE MEMORY from firmware when the CPU is reset.

Counting, timing and arithmetic functions are delegated to external, peripheral circuits unless their scope is sufficiently limited for the CPU not be burdened by them.

Fast transfers of large amounts of data are, likeware, handled by means of specialized peripheral circuits when such transfers would slow down the CPU.

REPRESENTATION (i.e., the order and structure of the data) is made to conform to human thought. The significance and context of an item of information in memory is inferred from the physical placement of that item of information with respect to FLAGS or other items of information. Desginated Memory areas used to store related intermediate results and database (like frames in a motion-picture film, or scenes in a theater play).

Information in memory is organized in sequences called SEGMENTS. Each SEGMENT has a start FLAG and includes not only algorithmic or data items, but also REPRESENTATIONAL descriptors, qualifiers, specifications and "direction for use." The latter REPRESENTATIONAL items are identified by their location (in a parallel configuration) or their order (in a serial sequence) with respect to the start FLAG.

From the point of view of the software, each SEGMENT is represented by its symbolic NAME and constitutes a well-behaved entity.

AD-HOC PROGRAMMING is made possible by the use of a simplified syntax based on the use of NAMES (instead of "instructions") and built-in hardware and software development tools. These include "PROM BURNERS" for the generation of "firmware."

RECOGNITION tasks are handled by specialized, peripheral analog and digital circuits. These include the ORGANIC MEMORY (patent pending).

DATA ACQUISITION (input) HARDWARE consists mainly of arrays of standardized, programmable analog voltage/or impedance sensitive buffer amplifiers. It also includes analog to digital converters, and, typically, a UART. DATA ACQUISITION modules are interrogated by the CPU or one of its peripheral PATTERN RECOGNITION circuits in a random order but respond after a constant, short time delay with the digitized equivalent of a sample of the designated input function. (Real-time, random access to SENSOR inputs is also required in order to facilitate RECOGNITION tasks and reduce memory storage of unprocessed SENSOR data.) Pipelined operation is an option, with interrogating signals and digitized samples traveling both ways at the same time ("duplex mode").

ALL PERIPHERAL HARDWARE (including DATA ACQISITION and READOUT circuits) is represented as memory locations. The signals that are transmitted/received include address, data and control information. A few, reserved and/or identifiable spaces contain a NAME, identification and other REPRESENTATIONAL data as might be required by an INTELLIGENT program.

Serial communication format includes not only the "start" and "stop" bits commonly used with UARTs but also "start of sequence" FLAGS (i.e., pre-defined time-intervals during which no data is transmitted) to allow for further REPRESENTATIONAL features in the data sequences that follow, such as the address and control data previously mentioned.

Multi-wire or "bus" communication hardware includes all the necessary control and data lines used to select memory locations.

The transition from digital to analog format is effected by a patented technique called INTERPOLATION. INTERPOLATION not only improves picture and sound quality in video and audio READOUTS but also considerably reduces the latter's memory requirements.

READOUTS include, but are not limited to vector graphic video displays and triangle-wave sound generators. Video displays are the main medium for the communication of intelligence, but audio generators can be used for speech back-up, warning and emotion-generating messages ("ambience,"etc.).

DETAILED DESCRIPTION

Block Diagram

Figure 1:
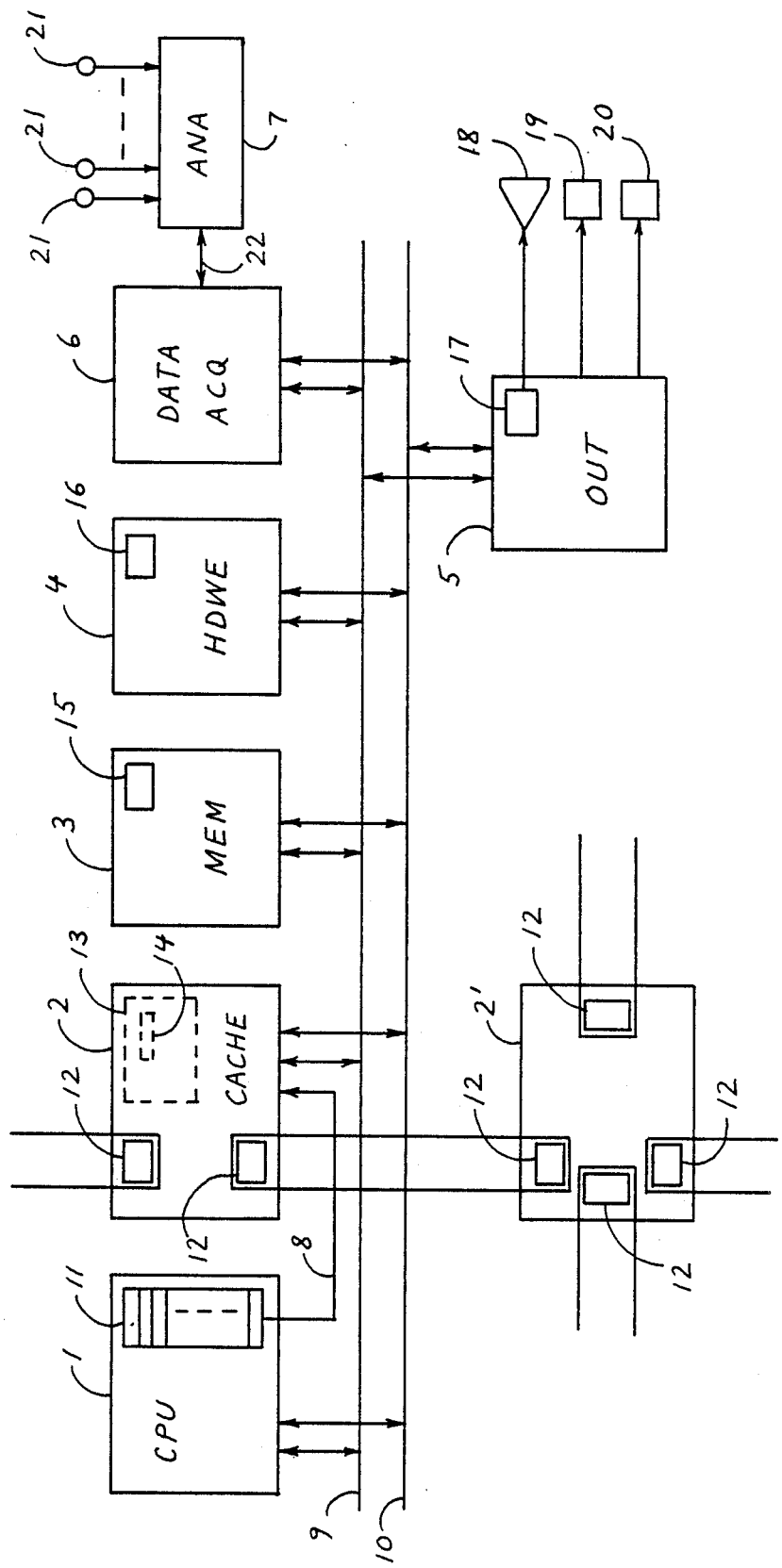
FIG. 1 is block diagram of the invention.

FIG. 1 is a block diagram of the VDH BICOMPUTER of this invention.

There are seven main groups of electronic circuits:
Group 1 is the CPU;
Group 2 is the CACHE memory;
Group 3 represents the external MEMORIES;
Group 4 represents miscellaneous HARDWARE functions;
Group 5 represents OUTPUT circuits;
Group 6 and 7 represent the DATA ACQUISITION circuits.
There are three "buses:"
Address bus 8;
Control bus 9;
Data bus 10.

CPU 1 has multiple registers 11 that function as stack pointers, program counters, data registers and address pointers generally. The addresses generated by multiple registers 11 are sent to CACHE memory 2 via address bus 8.

CACHE memory 2 is, in fact, the "working memory" of CPU 1. However the architecture of CPU 1 itself is such that I/O data transfers from CACHE memory 2 to data bus 10 and vice-versa occur in the time interval of a single instruction cycle of CPU 1, i.e., without first having to be loaded in an "accumulator" in CPU 1.

When the VDH BICOMPUTER is configured as a multiprocessor, CACHE memory 2 includes areas 12 (consisting of memory devices with fewer locations than are addressable through address bus 8) that are equally accessible in the CAHE memory 2' of one or more other CPU's. The devices of areas 12 can consist of FIFO's but preferably are "dual-port" memories.

CACHE memory 2 contains data grouped in areas of association 13 which themselves contain a number of structured SEGMENTS 14.

Group 3, the external MEMORIES, contains the "main memory" plus other assorted memory devices, including, but not limited to, ROM, "firmware" and "PROM burners." A "bootstrap" circuit 15, which includes a DMA controller, loads the initial program in CACHE memory when power is first and turned on.

Group 4 includes PERIPHERAL HARDWARE used to offload functions from the software. These circuits include, but are not limited to, pattern recognition circuits 16.

Group 5 includes READOUT circuits that generate pictures, sounds and other outputs in transducers 18, 19 and 20. Pictures are generated by a vector generator 17.

Groups 6 and 7 feature circuits used for DATA ACQUISITION. They include all the necessary functions for randomly accessing SENSORS 21. However, it is often desirable to separate the analog interface 7 so that it can be located in the immediate vicinity of SENSORS 21. Transmission line or medium 22, plus the attending UART's and modems (if used), are then used to connect groups 6 and 7.

Intelligence: A Working Definition

INTELLIGENCE is defined here as "That quality in a machine that makes it so that the user need not be intelligent."

The main effect of INTELLIGENCE is simplicity—simplicity of use, service, manufacture, etc.

There is no official definition of INTELLIGENCE. The one offered above is a tangential but useful one. It is indeed necessary to explore the concept of INTELLIGENCE in order to be able to understand how a new, more enlightened level of simplicity may be attained.

Attributes of Intelligence

In spite of the fact that the goal of defining INTELLIGENCE seems somewhat elusive, certain facts are emerging. Among these are the following:
Intelligence acts differently in different contexts.
Intelligence requires access to information (databases).
Intelligence uses symbols, i.e., internal constructs that represent outside, real objects and their interrelationships.
Intelligence requires the ability to compare objects and groups of objects, even if they are only approximately identical. This is referred to as "pattern recognition."

Intelligence requires the ability to make choices —"decisions"—based on past events.

Intelligence is flexible, i.e., capable of re-arranging sets of data and sequences of operations based on results obtained previously. This is part of the "heuristic search."

Intelligence can modify itself (grow, learn).

(Yet to be proven) Intelligence requires a motivating, direction-giving "force." In living things, the urge to survive serves the purpose.

(Yet to be proven) Intelligence is characterized and limited by its characters' intelligence on the other hand, and its own past experiences on the other.

(Yet to be proven?) Intelligence requires neither speed, nor power, nor accuracy to succeed in a given endeavor. Time is the only requirement, and that, in inverse proportion with the quality of that intelligence and the resources at hand.

It is important to remember that architectures are not absolute, but instead vary as a function of the medium through which INTELLIGENCE is expressed.

CPU and Instruction Set

Machine code represents computer instructions at the lowest level. Each instruction triggers a well-defined event.

The most basic event consists of moving an item of information —a digital "word"—from one location to another. These locations are designated as memory locations, buffers, registers, accumulators, etc. according to their purpose. All share a common property: they are capable of storing a digital number. All are "places" where data can be held prior to undergoing a transformation and/or where results can be found after an operation has been performed.

Computer instructions, no matter how numerous and "powerful" are in fact modifications of the basic instructions that move data. For this reason, the size of an instruction set (i.e., the number of different kinds of instructions) is not a measure of computer excellence but rather an indication of specialization and optimization of certain functions. It has been shown that a large instruction set can in fact represent a handicap: it complicates the architecture of a computer and makes it impossible to generalize the use of basic commands such as are used to move data. Indeed, it is the use of ALU's and other hardware options that tends to customize the architecture of a microprocessor while at the same time calling for different protocols in order to access similar, but off-chip functions. Reduced Instruction set Computers (RISC) are industry's answer to the problem.

The conditional statement is what distinguishes a true computer from a mere sequencer. The JUMP IF... mnemonic is an adequate start for higher level decision algorithms in software.

CPU and Registers

The availability of built-in registers that can be used as memory, stack and program counters in sufficient numbers is vital to the implementation of Artificial Intelligence because it permits two or more levels of software to coexist, each with its own stacks and pointers. Recursiveness, reentrancy and relative addressing and branching are amoung the features that can then be implemented.

Cache Memory and Transportable Code

According to comtemporary experts, CACHE MEMORIES are buffers that hold information needed at a particular time where a CPU can reach it without the delays that are typical of large main memories.

The fact that programs or elements of programs are continuously copied into CACHE MEMORY implies that program code is "transportable," i.e. can be executed from any memory location. This usually means relative addressing and branching, and the use of "virtual" or temporary addresses.

When the chosen CPU features multiple registers and fast I/O data transfer rates, the memory space that its address lines encompass can be dedicated for use as a CACHE MEMORY. Larger ("main") memories are accessed via the I/O ports without undue additional delays. The only additional requirements are for a hardware circuit that will load the initial "bootstrap" and other programs from firmware and the appropriate software program to manage the "virtual address" lookup table.

In the present architecture, a "virtual address" as above is included in the NAME associated with each specific SEGMENT of code. See the section on NAMES AND SEGMENTS following.

Multiprocessing

One of the most limiting features of processors is the fact that they can execute only one small step at one time. Tasks that must be performed concurrently must "take turns" being executed. This results in timing problems and reduced efficiency.

The "brute force" solution consists of increasing the speed of processing and the size of the digital "words."

This solution leads to extremes of design and manufacturing complexity. Increased speed or bandwidth of electrical signals also means increased power consumption, and increased power consumption in turn means an increase in the physical size, weight, failure rate and cost of both individual components and power supplies. Moreover, as the overall size of the system increases, so does the length of the path over which the electrical signals must travel. This causes varying transmission delays, "skewing" and "race conditions"—unwanted changes in the relative timing of the data bits.

A better solution, especially in large systems, is to increase the number of processors. The problems of communication and timing still exist, but they can be resolved in a more satisfactory manner.

In the present architecture each processor is put in communication with one or more neighbors by means of shared portions of CACHE memory referred to as SHARED MEMORIES.

SHARED MEMORIES, also known as "dual port" memories, can be written into or read from by two separate users at the same time. This is, of course, impossible from a strictly physical point of view. What really happens is that it is the memory that takes turns servicing its two users in such a way that it is unavailable to any one user only during periods of time during which it is known that that one user will not need access to it. The hardware needed to control the dual-porting process can be included in the same package as the memory device, or an external circuit can be used to offset the clocks of neighboring processors so that they do not require access to the SHARED MEMORY at the same time. (Processor timing cycles do not always permit this.) Note that a more usual method consists of using FIFO (i.e., first one in, first one out) memories. The method used here as the advantage of simplicity and speed from the standpoint of the processor.

SHARED MEMORIES allow each processor to communicate with as many other processors as desired.

With four SHARED MEMORIES each processor can access a North, South, East and West neighboring processor and a two-dimensional array of processors can be built. When six SHARED MEMORIES are used, an Up and Down neighboring processor can be added, making a cubic array possible, and so on.

One of the many remaining alternatives is to use one processor as a "post office" accesibly by all others.

Thus the relationships in a community of processors can be patterned after human institutions like democracy, oligarchy, bureaucracy, etc.

Offloading of Functions by Means of Hardware

Certain functions are by their very nature easier to implement in hardware than in software. This is especially true when real time operation is a requirement. Among them are the following:

Complex mathematical functions (require an unusually large number of processing steps)

Timing and Counting (make the CPU unavailable for tasks and delays their execution)

Pattern Recognition (requires the simultaneous weighting of several different inputs, often in real time)

Fast Transfer and Packing of large data blocks (requires too many steps)

Smooth functions (too many intermediate points, inordinate memory requirements)

Representation

In Nature, INTELLIGENCE involves risk-free trial and error experimentation in the non-real world of thought. At least one of the basic goals of thought is to promote survival by anticipating the consequence(s) of contemplated actions.

It may be that INTELLIGENCE will one day be defined as thought, or, more to the point, internalized REPRESENTATION by means of symbols.

It may be that REPRESENTATION is the essence of INTELLIGENCE.

Since a human being must always be able to create, monitor or modify the internalized symbolic models used by the machine, these internal, symbolic models must be in harmony with human thought and easy to communicate to human beings.

Other requirements include:

An adequate set of symbols (i.e., meaningful and in sufficient numbers)

Relational or associative features by means of which symbols can be placed in context Boundaries that define and enclose complete items (tasks, situations, means, etc.)

Visibility by a human being, i.e., visual, auditory, etc. counterparts.

Associated and relationships can be expressed as functions of either TIME or SPACE.

TIME REPRESENTATION uses a time interval to denote closeness of relationship. Time is a one-dimensional variable that facilitates analysis (i.e., the consideration of one single item, task, etc. at a time and in the proper order). Music is an example where time-related elements such as frequency, duration, rhythm etc. dominate.

SPACE REPRESENTATION uses physical distance to denote closeness of relationship. Space is two-dimensional and allows for a greater variety in the expression of relationship. Visual images represent one of the most potent media for modeling and integration (i.e., the consideration of whole sets of items, tasks, etc.).

REPRESENTATION has a pronounced effect on both hardware and software, and vice-versa.

Memory Structure and Representation

MEMORY provides the "landscape" or information background for INTELLIGENCE. The physical location of data in memory also contributes to REPRESENTATION.

In order to best utilize the representational potential of MEMORY, the following guidelines are followed:

States or situations are represented by contiguous memory areas in which are brought together the pertinent data.

Memory areas are used as buffers to store the results of processes and provide intermediate "nodes," translations or summaries between processing steps, thus also facilitating the transition between different programs.

The sequence structure in a memory area can be standarized in such a way that specific kinds of qualifying information about a set or sequence can be found at known places, thus facilitating INTELLIGENT processing.

Memory areas can serve as "mail boxes" in which information can be deposited and from which information can be retrieved at different times, thus facilitating asynchronous operation and the transition between parallel and serial data structures.

The grouping of information in adjacent areas of MEMORY according to the preceding guidelines produces a succession of "images" with an action component included that is reminiscent of "scenes"in a motion picture or theater play. This combination of background and action is the reason why SEGMENTS (code sequences; see later) are represented by NAMES rather than commands ("instructions").

Memory Structure vs Word Structure

In the preceding discussion it has been stated that REPRESENTATION is a result of memory structure. Associations and relationships are established by the physical placement or order in which data items are stored in memory.

This is not the prevailing practice in A.I. Here REPRESENTATION is the result of the structure of the data items themselves. Data items are linked by software "hooks" or pointers that are contained within them. For instance, if an item consists of a 32-bit binary digital "word," then the first 16 bits might contain numerical or symbolic information, and the last 16 bits might contain the address of the next (most closely associated?) word.

"Hooking" consumes a large but predictable amount of memory. It makes it easy to insert or cut out elements in a sequence. Data do not have to be copied; it is only the "hooks" at the connecting nodes that are modified.

One of the side-effects of "hooking" is that the memory address at which an item of information may be found easily becomes meaningless or even unknown.

The number of memory locations involved in a given "list" is not immediately apparent.

It must be said that the practice of REPRESENTING data without using "hooks" is not used elsewhere because it cannot realistically be contemplated in present-day digital computers. The latter do not have the support of specialized hardware to assist the CPU in performing the necessary packing and data transfer functions, and there is no control over the quanity of data that might be involved in any given transfer. These hardware and software requirements have been anticipated and will be dealt with later.

Names and Segments

In the present architecture, the data unit consisting of a number of contiguous memory locations is called a SEGMENT. INTELLIGENCE residues inside the SEGMENT in the form of a "context map." This "context map" occupies a well-defined place with respect to the start FLAG (see below) within the space allocated to the SEGMENT.

In the present architecture, "routines" occupy only a part of each SEGMENT, and the work "instruction" is note entirely appropriate.

The SEGMENT is the closest high-level equivalent of the traditional "instruction." Like the "instruction," it is indivisible (i.e., no branching is possible from within one segment to another SEGMENT or part of a SEGMENT).

SEGMENS are associative units. They can thought of as functions rather than commands. This distinction is of the greatest importance in resolving a host of architectural conflicts, including the distinction between "smart" and "dumb" processes. They are more than "lists" and allow a more rigorous control of memory use, thus contributing to the feasibility of "non-hooking" intelligent code. (See previous section: MEMORY STRUCTURE vs WORD STRUCTURE.)

SEGMENTS not only include machine or high-level code, but also REPRESENTATIONAL elements such as an ENGLISH NAME, a MACHINE NAME (or simply NAME), an indication of how much memory space is involved, the kind of processing required, etc.

The start (i.e., lowest address) of a SEGMENT is called the start FLAG.

The REPRESENTATIONAL information within a SEGMENT is stored at predetermined addresses in relation to the start FLAG.

MACHINE NAMES, or simply NAMES, are in fact CACHE MEMORY addresses with a DESCRIPTOR prefix added. At the same time, they constitute the symbolic representation of the SEGMENTS of which they are a part.

From the point of view of software, SEGMENTS are well-behaved components, i.e., it is not necessary for the programmer and/or the machine to know the internal details. "Directions for use" and other prerequisites are included near the start FLAG at predetermined (relative) locations.

For further details regarding the structure and processing of SEGMENTS, see the sections on SOFTWARE.

Recognition

RECOGNITION is a process for detecting the presence of an entity based on the availability of pertinent clues.

An entity can be a set, in which case the clues are represented by items or combinations of items known to belong uniquely to that set.

A real-world entity can be an individual object or situation, in which case the clues to its presence might include specific signals or stimuli received from it. Such a real-world entity must have its corresponding REPRESENTATION as a set internalized in a computer's memory before that computer can recognize it.

RECOGNITION of data in memory is intimately dependent on REPRESENTATION.

RECOGNITION is also dependent on the hardware and software used to implement it.

A RECOGNITION task can, in some cases, be performed with the use of a "truth table." Truth tables, being parallel REPRESENTATIONS, are best implemented in hardware.

Other filtering and time-dependent feature-extraction algorithms are, likewise, best implemented in hardware.

When the data to be recognized follows a natural pattern—i.e., when relationships can be expressed as differential or other equations that reflect the laws of physics, if is often advantageous to use analog circuits.

Organic and Associative Memory

The ORGANIC MEMORY is a proprietary hybrid circuit (i.e., one that is made up of a combination of analog and digital circuits) used for pattern recognition.

The expression ORGANIC MEMORY refers to a memory that exhibits some of the characteristics of living memories.

All living memories are capable of forgetting—a fact that is taken to imply a fundamental weakness. But the advantages of forgetting can be very real when it is under control. If nothing else, it establishes a perspective with respect to time which helps influence decisions by emphasizing more recent events.

Spontaneous, progressive discharge is the equivalent of forgetting in analog electronic circuits. A typical example is the decay of the charge stored in a capacitor when it is shunted by a resistor. The combination of resistor and capacitor is known as an RC network; its "time-constant" is the product of the resistance R times the capacitance C. RC time-constants play a vital role in analog filter circuits and can be combined with digital switches to achieve the kind of hybrid circuit known as a "switched-capacitor filter."

Switched-capacitor filters are programmable, i.e., the effective RC time-constants can be varied as a function of a binary digital "clock."

The ORGANIC MEMORY goes a step further but uses a digital memory instead of the analog one (i.e., the capacitor). The digital value D stored at a given address is the product of an input signal S multiplied by a "weight factor" W. At the same time, digital value D decreases as a function of time according to a "quality factor" Q. The necessary multiplications and additions are performed in real time by means of analog circuits and digital to analog converters. Accuracy is limited to approximately one percent, but this is ample for most applications.

An ASSOCIATIVE MEMORY can be built using the combinations of an ORGANIC MEMORY, a sequencer and a selector. Data from SENSORS or other external sources are sampled in precise order and at precisely controlled times and stored in ORGANIC MEMORY at addressed associated with objects, patterns or states. The sequencer controls the identity of the source S, the time of sampling T, the weight factor W and the quality factor Q of each input. Its program reflects a specific algorithm and can be loaded from the CPU or firmware.

The ASSOCIATIVE MEMORY can, among other things, replace the FFT (Fast Fourier Transform) hardware and software normally used to compute the spectral content of sounds and other waveforms.

Problem-Solving

PROBLEM-SOLVING is essentially a matter of matching requirements with available resources. Each task or process has well-defined pre-requisites and yields well-defined results. These pre-requisites and the kinds of results that will be returned by an algorithm or procedure can be described in a set of input and output "specifications".

Input and output specifications, when they are used, also have an assigned place with respect to the start FLAG of a SEGMENT. This is part of the REPRESENTATIONAL features discussed previously and allows INTELLIGENT programs to perform heuristic searches.

Typically, problems that are solved by digital computers require elaborate algorithms and exact numbers. INTELLIGENCE can make use of simpler algorithms and low precision numbers by substituting a more progressive, self-correcting approach. The difference between a result obtained as a "first guess" and the intended result can be used to compute the next attempt, and the next, until the last result is sufficiently close to the one intended. Errors are therefore not cumulative. This kind of iterative approach is called "non-exact loop closing" and is in harmony with natural processes and hence, humancompatible REPRESENTATION.

INTERFACES AND MEMORY OPTIMIZATION

Input SENSORS, such as electrodes and transducers, and human interfaces such as video monitors and keyboards, are accessed in the same way as all non-CACHE memoriers, i.e., through I/O ports, and are "memory-mapped."

Corresponding protocols have been evolved for both serial an parallel communications. In each case, the equivalent of address, data and control signals are transmited. The start FLAGS used at the start of serial data streams is the REPRESENTATIONAL feature that helps identify the relative location of address, control and other data qualifiers. The sampling of imput functions can thus also be randomized for use with ASSOCIATIVE ORGANIC MEMORIES.

The combination of real-time operation and random access to external data from SENSORS offers the possibility of reducing memory requirements. Indeed, the environment itself is a form of memory, but one that must be accessed whent the data is available rather than at the convenience of the processor.

Real-time output generation also saves memory. Consider the case of analog output waveforms. If a waveform generator is capable of working in real time by drawing connecting "ramps" between end-points representing changes in slope, then the only data that need to be stored in digital memory are end point timing and magnitude. The alternative is to store all intermediate points of the waveform. The memory requirements then expand in proportion to the resolution requirements (sometimes more than two orders of magnitude). See also INTERPOLATION following.

Digital Circuits

DIGITAL components are packaged assemblages of ANALOG electronic components, such as resistors and transistors.

All DIGITAL components are designed so that only two states are possible at all inputs and outputs. They are used to implement binary, discrete, standardized numerical operations and (boolean) logic functions that can be defined by "truth tables. "

DIGITAL circuits include bistable "cells" cells that represent the elements of digital memories and related functions such as buffers, flip-flops, latches, etc.

DIGITAL circuits are best for
High programmability
Noise immunity
High precision
Perfect data retention
exact mathematical and logic operations DIGITAL processes are characterized by
Exact definitions ("truth tables")
A very large number of very small steps
No inherent reference to real time
Discontinuous functions ("granular" appearance on a screen)
An abundance of "glue logic" that includes timing, sequencing, interface and other support circuitry that takes considerable time to design
The need for analog circuits and devices to interface with the natural environment

Analog Circuits

ANALOG circuits use the same basic electronic components found in digital circuits—plus a few more. Human data communication devices such as CRT's and switches are also analog components.

ANALOG circuits cannot be defined by truth tables. They follow the laws of physics and their specifications can be very complex.

The behavior of ANALOG circuits is "analogous" to that of mechanical systems and can be represented by differential equations. Capacitance, inductance, resistance, voltage, electrical charge and current can be used to represent elasticity, mass, friction, force, displacement and speed respectively. There were ANALOG COMPUTERS before there were digital computers.

ANALOG circuits are best for
Speed of computation
compactness
simulation of physical systems, filtering, pattern recognition
algorithms where many variables are handled simultaneously and in real time.

The accuracy of analog circuits is limited by the physical nature of components. Noise (i.e., unwanted information) is a problem.

Perhaps the greatest handicap of ANALOG circuits is the fact that component values are difficult to change. Analog programming consists mostly of changing connections and modifying resistance values.

HYBRID CIRCUITS, where both analog and digital circuits are used, have the advantage of greater programmability.

The problems and limitations associated with ANALOG circuits tend to be overrated and are aggravated by the fact that ANALOG design is an art with too few trained practitioners.

Interpolation

Interpolation is a function that may be used to obtain additional values between sampled values (IEEE Standard Dictionary).

It can be used to effect a transition between digital and analog functions. The INTERPOLATION circuit referred to in what follows generates a continuously variable ANALOG voltage output that represents the transition between two values supplied in digital form.

INTERPOLATION is therefore done with HYBRID CIRCUITS.

Whereas the ANALOG circuit is traditionally an integrator, the proprietary circuit used here features pairs of digital-to-analog converters whose outputs are tied together. The method is simple and has the advantage that circuit errors are not cumulative.

The subject is covered in greater detail in U.S. Pat. No. 4,649,506.

Data Acquisition

For a machine to be free of human dependency, it must have direct access to the environment. This is done through the intermediary of DATA ACQUISITION circuits.

DATA ACQUISITION circuits and devices are the (analog) eyes, ears, etc. of machines. They supplement human data entry devices such as keyboards and may, some day, replace tham entirely.

A DATA ACQUISITION system can be optimized so that only a minimum of inconvenient or invasive measurements are needed. By substituting different kinds of software, peripheral measurements can be used to arrive at the internal state or structure of an object. This is known as "Computer Aided Tomography."

Since all peripheral SENSORS respond to the environment by generating electrical outputs, it is possible to limit the kinds of input analog circuits to standard arrays of (programmable) impedance bridges and voltage amplifiers.

The use of analog circuits and the need to limit the number of long electrical wires virtually dictates that DATA ACQUISITION circuits be located in close proximity to the environment to be monitored and that a serial mode of data transmission be used to communicate with the computer.

Readouts

A VIDEO READOUT conveys much information in parallel. It requires that the user keep his eyes trained on it and therefore can be ignored. It allows a certain amount of freedom insofar as what information the user wishes to consider first, and how much time will be spent on each item. It is by far the most efficient man-machine interface.

An AUDIO READOUT conveys items of information one at a time. It cannot be ignored and is, therefore, good for attracting attention. Each item of information is lost unless captured at the time appointed by the machine, thereby encroaching on the user's thought processes. It is, however, useful in situations where the user must keep his eyes closed or on a different task. AUDIO READOUTS can also supplement VIDEO READOUTS. When it is desired to influence emotions, AUDIO READOUTS can be very effective. Much remains to be explored in this area.

Other kinds of readouts are possible as weel: a TACTILE READOUT is one possibility that has been tried on blind people and TEMPERATURE ("hot/cold") READOUTS have been used in neurological studies. There is no doubt that as our understanding of human perception improves, new methods of man-machine communication will be developed.

The CRT/Vector Generator Combination

Lines that represent the boundaries of shapes contain the vast majority of the information represented in a picture. Vector graphics are the most efficient way of inplementing INTELLIGENT video displays.

Because line drawings ("sketches") are so appropriate in representing ideas and situations (symbols and ideograms are an example) and because they are so much easier to generate by means of computers, it is likely that vector displays will become increasingly important in the near future.

An interesting consequence of the new age of Artificial Intelligence is that memory-saving schemes are increasingly sought after. Raster displays contain a very large proportion of redundant information and new techniques of "data compression" have been evolved to eliminated some of it. Vector displays contain virtually no redundant information.

The CRT is inexpensive and has the best color, contrast and resolution of any display medium likely to be available for the foreseeable future. It is making headway in low-power, miniaturized flat screen applications. It is overcoming the problems of high-vibration, high-temperature, and high-ambient light level environments and is about to invade the automotive and avionic fields (epecially in Europe and Japan).

Interpolative Video Vector Generator

The technique of INTERPOLATION mentioned previously can be use to generate the necessary deflection waveforms for a CRT vector display.

All that needs to be stored in digital memory is information about the X and Y coordinates of each point between which straight line segments are connected, and information about the length, color and texture of each line segment. This amounts to between 3 and 8 bytes of digital memory per line segment.

The INTERPOLATING circuits draw the line segments that connect the end points from digital memory without the cumulative errors, end point discontinuities and other artifacts commonly encountered in other contemporary circuits using integrators.

For further information, use U.S. Pat. No. 4,649,506.

Interpolative Audio Waveform Generators

There are several known techniques for reconstituting analog sound waveforms from data in digital memory. Always there is the problem of filtering the noise that from discontinuities in the analog waveform after conversion from the digital format.

The problem can be solved, or at least greatly minimized by storing the "points of greatest intelligence" in digital memory and using INTERPOLATION circuits as previously discussed to generate the analog output.

The "points of greatest intelligence" are those where the analog waveform changes slope. When a pure sine wave is represented, the "points of greatest intelligence" are the maxima and minima (i.e., the "peaks").

When these "points of greatest intelligence" are connected by straight line segments, a "triangular" waveform is obtained whose unwanted harmonic content is very low. A simple first order filter (i.e., an integrator) is all that is normally required.

Names in Software

VDH AD-HOC programming has a very limited syntax. It uses NAMES instead of instructions.

The programmer can use existing NAMES and/or create his own vocabulary.

A NAME consists of a short word made up of a few characters which represent a well-defined task, process, set or item of information. However, and as will be seen later, a NAME is more than a simple mnemonic. It is "called" rather than "executed."

Programming consists of writing a sequence of NAMES. NAMES are "called" in the order in which they are written.

In the course of program execution, the program will grow and shrink as NAMES and sequences of NAMES are inserted or removed.

RPN Style

Programming style is similar to the RPN (Reverse Polish Notation) used in Hewlett-Packard calculators: operands always precede operators.

Any length of NAME code that precedes the NAME of an operation serves as its operand. Before this operation NAME can be called, however, all preceding NAMES will have been called, leaving only results that are (must be) of the same kind as those required by said operation NAME.

The process is equivalent to following a recipe. Before any given step can be carried out, the preceding steps must be carried out first so that the ingredients will have reached the proper mix, consistency, etc. for the given step to be carried out successfully.

Descriptors in Software

The processing of NAMES is made easier by the use of DESCRIPTORS.

Each NAME (at least in its machine code translation) includes a DESCRIPTOR prefix which tells the machine (among other things) whether to treat it as a final result, an executable code sequence or a non-executable code sequence. This feature paves the way for intelligent processing.

Segments in Software

SEGMENTS constitute the basic software building blocks that are represented by NAMES. More than that: they are at the core of intelligent programming in the VDH BIOCOMPUTER.

Each SEGMENT is stored as a string of bytes in successive memory addresses. This code sequence, which represents either algorithmic or parametric data, always begins in a standard format.

This standard format represents "information about information." It is in fact an embryonic "specification."

The minimum structural requirments for the beginning of a SEGMENT are as follows:
1. Start FLAG: a buffer zone or "leader" of at least 4 bytes with numerical value FF (hex) (ASCII Rubout)
2. Byte 0: Beginning of ENGLISH NAME Flag: one byte with a numerical value of 0 (zero) (ASCII Null)
3. Bytes 1 to 8: ENGLISH NAME in ASCII code; unused spaces at the end must be ASCII Space code (0010 0000).
4. Bytes 9 and 10: MACHINE NAME: a hexadecimal code:

The first nibble (4 most significant bits of byte 9) is the DESCRIPTOR. The first bit of this DESCRIPTOR denotes the inclusion of additional specifications immediately following byte 13. The rest of the code (4 least significant bits of byte 9 and all of byte 10) represents 12 bits of LINKER memory address (also referred to as a "virtual address" in CACHE memory).
5. Bytes 11 and 12: Total Number of Bytes Following (a 16-bit hexadecimal number).
6. Bytes 13 and following: Program or Data, preceded by additional specifications if called for by bit 1 of byte 9.

There are additional structural requirements, as follows:
the last byte of a SEGMENT is a "return" instruction;
the non-REPRESENTATIONAL part of the SEGMENT, when it is composed of "dumb" (machine) code, must take care of pointing Register R9, the OPERAND pointer, in order to "pop" OPERANDS and "push" results (OPERANDS for the next NAME) on the left side of DOUBLE-ENDED STACK 39 (see later).

The Processing of SEGMENTS is mediated by three resident utility programs: the LINKER program, the TRANSLATOR program and the DISPATCHER program.

The LINKER program logs the actual starting addresses of the SEGMENTS in LINKER memory (a lookup table in CACHE memory), the TRANSLATOR program converts machine code to human understandable code and vice-versa and acts as a program development tool, and the DISPATCHER program uses the DESCRIPTOR portion of the MACHINE NAME to determine the correct processing method and place for the NAME or SEGMENT.

The additional information referred to as "specifications" can be generalized to include input and output specifications, well as other information such as "directions for use." This kind of information is necessary for the use of SEGMENTS in heuristic searches.

Definitions

From an operational point of view, a SEGMENT is identified and located by means of its NAME. The NAME also provides basic processing information.

From a logical point of view, a SEGMENT is the precursor and contains the DEFINITION of a NAME. Indeed, a DEFINITION is nothing more than a more complete and detailed description of the same function.

New SEGMENTS are created in the process of DEFINITION with the help of the TRANSLATOR program. The programmer can write code either in machine code or in NAME code.

The ENGLISH NAME is chosen by the programmer to enhance ease of memorization.

The programmer also chooses the DESCRIPTOR prefix that will determined how the NAME will be processed.

The MACHINE NAME is assigned by the programmer or the machine from a list of available addresses in LINKER memory.

Note: MACHINE NAME assignments are absolute in the sense that they must always point to the same SEGMENTS for any program or set of programs likely to run concurrently.

Certain NAMES have no DEFINITION, i.e. there is no corresponding SEGMENT in program memory. Typical of those NAMES are those that represent punctuation marks and other symbols that are used at the discretion of the programmer in order to enhance REPRESENTATION but are meaningless as far as the machine is concerned. Typical also are symbols that are meaningful in terms of the syntax because they are used as "markers" for the beginning and end of sequences that must be handles as a unit and/or in a special way.

Intelligent Names

When a NAME is used to represent a sequence of NAMES, it cannot be executed by the processor and is said to be "intelligent." The utility software replaces each intelligent NAME by its DEFINITION before attempting to process it. Of course, the DEFINITIONS of intelligent NAMES can be nested—they can contain intelligent NAMES that are themselves DEFINED by intelligent NAMES, and so on. The process of replacing intelligent NAMES with their DEFINITIONS continues until machine code is encountered, at which point said code is executed in the usual way.

Linker

LINKER MEMORY is a lookup table in CACHE memory. Each even address is, at the same time, a "virtual address" and the NAME of a SEGMENT. The byte it contains, and the one following at the odd address, represent the actual, present 16-bit address of the start of the corresponding SEGMENT located elsewhere in CACHE memory.

Actual start addresses are loaded in LINKER MEMORY after programs have been loaded in CACHE MEMORY. This initialization procedure is carried out by a resident program in utility memory called the LINKER PROGRAM. The LINKER PROGRAM derives the needed information from the SEGMENTS themselves after loading.

Translator

The TRANSLATOR is a built-in software development tool that works in real time. It does not slow down program execution, however. This is because the DISPATCHER works with machine code only, and the TRANSLATOR is not needed unless the programmer needs to examine a NAME or sequence on the screen. The TRANSLATOR then finds the equivalent English expression, using the beginning part of each SEGMENT as a "dictionary" containing both the ENGLISH NAME and the MACHINE NAME (bytes 0 to 10).

The TRANSLATOR performs the usual keyboard entry and screen editing fuctions for text, symbols and graphic representations. For this it has access to the VECTOR GENERATOR and its special display generation features.

Last but not least, the TRANSLATOR mediates the creation of new SEGMENTS with special-purpose DEFINITION commands and software.

Dispatcher

The DISPATCHER interprets the DESCRIPTOR prefixes of each NAME and handles the NAME or SEGMENT accordingly. Additional details follow.

Software Model Based On CDP 1800 Family

In order to be provide a more specific example, consider the case of the CDP 1800 family of microprocessors by RCA/GE and second-sourced by Hughes. (The object is to demonstrate what can be achieved with even a "low power" processor. Greater speed and performance are indeed available in other processor architectures).

Data words are one byte (8 bits) wide.

There are 16 16-bit registers that can be used as "scratch-pad" memories, data pointers and program counters. They are assigned as follows:

R0: Program Counter after reset; DMA memory pointer
R1: Interrupt Program Counter
R2: Stack Pointer (LIFO)
R3: Main Program Counter
R4: SCRT (standard) Call Program Counter
R5: SCRT (standard) Return Program Counter
R6: SCRT (standart) In-Line Parameter Pointer
R7: DEFINITION and LINKER pointer (volatile)
R8: Auxiliary Intelligent Pointer
R9: OPERAND/RESULT Pointer
RA: OPERATOR/NAME Pointer
RB: DISPATCHER Call Program Counter
RC: Auxiliary Pointer
RD: Auxiliary Pointer
RE: Auxiliary Pointer
RF: Auxiliary Pointer The memory space accessible through the 16 bits of address is 65,535 bytes. This space is dedicated to CACHE memory.

Figure 2:
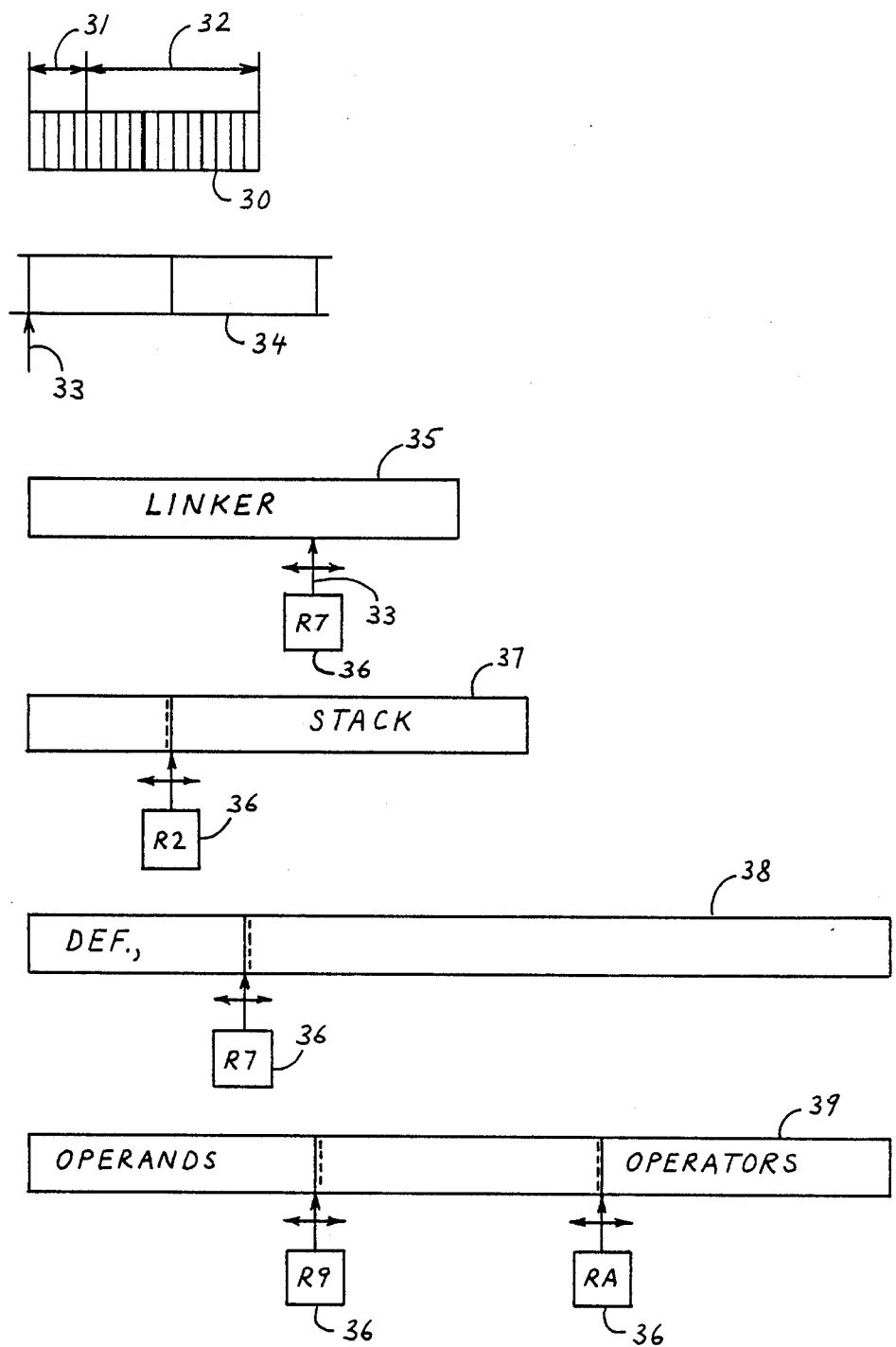
FIG. 2 illustrates software concepts.

Refer to FIG. 2.

FIG. 2 shows the partitioning of CACHE memory.

When power is first turned on, a special circuit in the initialization firmware (an external ROM accessible through the I/O ports like all memories except CACHE) causes the initial programs to be loaded in CACHE memory. Loading proceeds from CACHE address 0000 and takes advantage of the on-chip DMA circuits of the microprocessor.

As previously stated, the initial programs include utility routines, and, among them, the LINKER program.

The LINKER program loads the rest of the programs to be run from CACHE memory. These programs consist of a collection of SEGMENTS (described earlier). After the LINKER program is done loading the SEGMENTS, it locates the start FLAGS of the SEGMENTS and finds their MACHINE NAMES 30 (bytes 9 and 10 after the start FLAG).

The complete MACHINE NAME 30 consists of 16 bits (2 bytes). The first 4 bits are the DESCRIPTOR 31. The last 12 bits (32) are multiplied by 2 (shifted left) to obtain an address 33 in LINKER memory. A maximum of 4,095 NAMES can thus be accommodated.

LINKER memory 35 spans the first 8,191 bytes of CACHE memory.

Note: the first three addresses (hex 0000, 0001 and 0002) are reserved for a jump instruction to be used each time the CPU is reset without power interruption. Thus the hex Numbers X0000, X0001 and X0002 cannot be used as MACHINE NAMES.

Each SEGMENT's executable code (or more generally, the non-REPRESENTATIONAL part) begins at byte 13 relative to the start FLAG. The address of said type byte 13 in CACHE memory is the address at which the SEGMENT will be "called."

The LINKER program stores this calling address 34 as two consecutive bytes (16 bits) in LINKER memory 35. Address 33 of the first byte of address 34 (an even number) is the one computed from the NAME as previously described. Thus LINKER memory 35 constitutes a "lookup table" whose inputs 33 are derived from the MACHINE NAMES 30 and whose outputs 34 are the addresses where the non-REPRESENTATIONAL parts of the SEGMENTS begin (executable code in "dumb" routines, NAMES in "intelligent" ones).

When the LINKER program is done loading the LINKER memory with the address "lookup table", it initializes the software in preparation for running programs. This includes loading the NAME of the SEGMENT to be run in the OPERATOR side of DOUBLE-STACK 39 (see later).

Programs are run under the control of the DISPATCHER routine.

Memory pointers 36, consisting of the Registers whose assignments were described previously, give the DISPATCHER program quick access to five distinct zones in CACHE memory.

The first zone is LINKER memory 35, used to find the "calling" address of THE SEGMENT whose NAME is contained in Register R7.

The second zone is a LIFO (last in, first out) stack 37 mostly used to store return addresses. Its pointer is Register R2.

The third zone is program area 38 where SEGMENTS (or DEFINITIONS, depending on the point of view) and other routines are stored. The memory pointer is Register R7 also.

The fourth zone is DOUBLE-ENDED STACK 39, which is used to store OPERANDS on the left side (lowest addresses) and OPERATORS on the right side (highest addresses). Register R9 points at OPERANDS and Register RA points at OPERATORS.

The DISPATCHER program is initialized with pointer R9 at the extreme left end and pointer RA at the extreme right end of DOUBLE-ENDED STACK 39. DOUBLE-ENDED STACK 39 is then empty, save for one NAME at the extreme right. That one NAME is that of the program that it is desired to run.

The "pseudo-code" for a simplified DISPATCHER might consist of the following:
(Assume a typical situation where the DISPATCHER is called by the human via the TRANSLATOR program)
(Unless otherwise specified, run with Register R3 as the program counter)
(a)—(Return address for all "called" routines)
(b) If RA points to the highest address in DOUBLE-ENDED STACK 39, then EXIT (back to TRANSLATOR) . . . else continue
(c) Obtain the DESCRIPTOR (first 4 bits) of NAME pointed by RA.
If the DESCRIPTOR is 0, continue at (c0)
If the DESCRIPTOR is 1, continue at (c1)
If the DESCRIPTOR is 2, continue at (c2)

If the DESCRIPTOR is F, continue at (cF)
(c0) ("Dumb" Instruction: "execute") (Call the NAME, using a calling program with pointer RB as the Program Counter)
Switch to Register RB as the Program Counter "Push" return address (a) on "stack" using R2 as pointer
Compute the LINKER address using the 12 least significant bytes of the NAME pointed to by RA and put in Register R7
Obtain "calling address" pointed to by Register R7 (in LINKER memory) and load in Register R3; increment Register RA
Switch back to Register R3 as Program Counter (and "execute" "dumb" code in SEGMENT. SEGMENT ends in a "return" instruction that causes the CPU to run with Register R5 as Program Counter)
With Register R5 as the Program Counter
"pop" return address from stack using Pointer R2; put in Register R3
Switch to Register R3 as the Program Counter (and resume execution. When all "dumb" code has been executed, execution will resume at DISPATCHER address (a))
(c1) Copy left using Register R9 and RA as pointers; increment Registers R9 and RA continue at address (a)
(c2) (Code nto machine code)
Copy the NAME's DEFINITION (one or more NAMES) to the left of the leftmost NAME on the right side of DOUBLE-ENDED STACK 39—leave Register RA pointed to first NAME in sequence of NAMES just copied
continue at address (a)
(c3) Same as (C1)
(c4) Same as (c1)
(c5) Same as (c1)
(c6) Same as (c1)
(c7) (Spare) Generate an error message and EXIT
(c8) to (cF) (Specifications are included; special processing needed)

continue at address(a)

NOTE: As has already been stated in the previous Section on SEGMENTS, when machine code is used, OPERAND pointer (Register R9) is controlled by the include routine so as to "pop" OPERANDS and "push" results (i.e., OPERANDS for the next NAME) on DOUBLE-ENDED STACK 39.

I claim:

1. A method for programming a computer for enhancing said computer's ability to perform heuristic searches and other "intellingent" tasks, said method comprising the steps of
Grouping associated data, algorithmic and processing information in a code sequence called a SEGMENT;
Assigning a unique NAME to each SEGMENT;
Including in each NAME a PREFIX that indicates whether said each NAME will be copied from one end of a dual-entry stack to the other, or wheter it shall be replaced by other NAMES included in its DEFINITION on the same side of said dual-entry stack prior to being "called" or "execute," and whether or not said DEFINITION contains OPTIONAL (additional) INSTRUCTIONS;
Completing the abovementioned DEFINITION of each SEGMENT by writing in their proper place the following items:
a START FLAG;
an ENGLISH NAME;

a MACHINE NAME;
the NUMBER OF BYTES of code;
OPTIONAL (additional) INSTRUCTIONS;
a main body of said SEGMENT, consisting of either machine or "intelligent" code, the latter consisting of a sequence of NAMES as above;
an END (or RETURN) FLAG; and Involving during normal program execution the use of a special DISPATCHER calling routine, said DISPATCHER automatically copying said NAMES or their DEFINITIONS on one side or the other of abovementioned dual-entry stack depending on their PREFIXES.

2. The programming method of claim 1 additionally comprising the steps of

Using a TRANSLATOR routine for automatically translating an English NAME into the equivalent machine NAME or vice-versa;

Using a LINKER routine for automatically scanning a CACHE memory once each time one or more new programs are loaded in said CACHE memory, and finding the NAMES said CACHE memory contains and recording in a LINKER lookup table the corresponding start of execution absolute addresses.

* * * * *